(12) United States Patent
Namie et al.

(10) Patent No.: US 7,713,155 B2
(45) Date of Patent: May 11, 2010

(54) HYDRAULIC TENSIONER

(75) Inventors: Tsutomu Namie, Osaka (JP); Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 73 days.

(21) Appl. No.: 11/999,230

(22) Filed: Dec. 4, 2007

(65) Prior Publication Data
US 2008/0207365 A1  Aug. 28, 2008

(30) Foreign Application Priority Data
Feb. 27, 2007  (JP) ............................. 2007-047249

(51) Int. Cl.
*F16H 7/08* (2006.01)
(52) U.S. Cl. .................................................. 474/110
(58) Field of Classification Search ................ 474/109, 474/110, 111, 101; 137/538; 251/337
See application file for complete search history.

(56) References Cited

U.S. PATENT DOCUMENTS

| | | | | |
|---|---|---|---|---|
| 4,894,047 A | * | 1/1990 | Breon et al. ................ | 474/110 |
| 5,569,105 A | * | 10/1996 | Sakai et al. ................ | 474/110 |
| 6,120,402 A | * | 9/2000 | Preston et al. ............. | 474/109 |
| 7,001,295 B2 | | 2/2006 | Hashimoto | |
| 2002/0142871 A1 | | 10/2002 | Namie et al. | |
| 2005/0096166 A1 | * | 5/2005 | Wakabayashi et al. ...... | 474/110 |
| 2005/0272542 A1 | * | 12/2005 | Yoshida ..................... | 474/110 |

FOREIGN PATENT DOCUMENTS

| | | |
|---|---|---|
| JP | 3580424 | 7/2004 |
| JP | 3712951 | 8/2005 |

* cited by examiner

*Primary Examiner*—Robert A Siconolfi
*Assistant Examiner*—Anna Momper
(74) *Attorney, Agent, or Firm*—Howson & Howson LLP

(57) ABSTRACT

In the check valve of a hydraulic tensioner, a bell-shaped retainer is provided with plural, branched, leg portions which resiliently grip the outer surface of a ball seat. Oil induction slots are formed between adjacent branched leg portions of the retainer to provide oil flow paths that are unimpeded by the plunger-biasing spring of the tensioner.

4 Claims, 15 Drawing Sheets

HYDRAULIC TENSIONER

CROSS-REFERENCE TO RELATED APPLICATION

This application claims priority on the basis of Japanese application 2007-047249, filed Feb. 27, 2007. The disclosure of Japanese application 2007-047249 is hereby incorporated by reference.

FIELD OF THE INVENTION

This invention relates to a hydraulic tensioner, used for applying proper tension to a timing belt, a timing chain, or the like, in a vehicle engine.

BACKGROUND OF THE INVENTION

Hydraulic tensioners have been widely used in the timing transmissions of automobile engines to maintain proper tension in the timing chain or belt, and to suppress vibration.

As shown in FIGS. 10 to 12, in a conventional hydraulic tensioner 500, a plunger 520 is slidable in a plunger-accommodating hole 511 formed in a housing 510. The plunger 500 is formed with a cylindrical hollow portion 521 with one end open. The hollow portion receives a plunger-biasing spring 530, which urges the plunger 520 in the protruding direction.

The housing and the plunger together form a high pressure chamber R. A check valve unit 540 extending from the housing into the high pressure oil chamber at one end thereof comprises a ball seat 541 having a tapered ball-engaging opening 541b, which serves as a valve seat, a check ball 542 facing the ball seat 541, a ball biasing spring 543, which biasses the check ball 542 toward the ball seat 541, and a retainer 544, which supports the ball biasing spring 543. A through hole 544a is formed at the peak end of the retainer 544, through which, oil in the high pressure chamber R is replenished from an oil passage 541a in the ball seat 541. The hydraulic tensioner of FIGS. 10-12 is described in United States Patent publication 2002/0142871, published Oct. 3, 2002.

FIGS. 13-15 show another conventional hydraulic tensioner 600, in which holes 644a are formed in a side surface of a retainer 644 in a check valve unit 640, for replenishing oil in a high pressure chamber R from an passage 641a in a ball seat 641 to R. The hydraulic tensioner of FIGS. 13-15 is described in U.S. Pat. No. 7,001,295, granted on Feb. 21, 2006.

In a hydraulic tensioner disclosed in United States Patent publication 2002/0142871, as shown in FIG. 11, the retainer 544 of the check valve unit 540 is attached to the ball seat 541 and is pressed against the bottom of the plunger-accommodating hole 511 by the plunger-biasing spring 530. When the plunger 520 slides rapidly with changes in tension in a timing chain, the retainer 544 can shift its position along the ball seat 541. As a result, the movement of the check ball 542 is not reliably restricted by the retainer 544, and the check valve ceases to function reliably.

Furthermore, as can be seen in FIG. 11, when the plunger 520 is pressed back into the plunger-accommodating hole 511, the plunger-biasing spring 530, located in the gap between the plunger 520 and the retainer 544, impedes the flow of oil from the high pressure chamber R to the outside of the tensioner through the leakage path between the plunger and the internal wall plunger-accommodating hole 511. As a result, rapid changes in tension in the timing chain cannot be absorbed instantaneously.

Furthermore, as shown in FIG. 12, oil in the high pressure chamber R, is replenished by oil from the oil passage 541a of the ball seat 541 through a circular through hole 544a in the peak of the retainer 544. In this check valve, if excessive oil is supplied from the external oil supply, the check ball 542 can close the through hole 544a, cutting off the oil supply to the high pressure chamber R.

The hydraulic tensioner disclosed in U.S. Pat. No. 7,001, 295, has a problem similar to the problem exhibited by the tensioner in FIGS. 10-12. As shown in FIGS. 13-15, the retainer 644 of the check valve unit 640 (FIG. 13) is attached to the ball seat 641 and is pressed against the bottom of the plunger-accommodating hole 611 in tensioner housing 610 by the plunger-biasing spring 630. The check ball 642 is biased by a spring 643 into engagement with a tapered surface 641b formed at the end of the opening 641a of the ball seat 641. When the plunger 620 slides rapidly with changes in tension in a timing chain, the retainer 644 shifts its position along the ball seat 641. As a result, the movement of the check ball 642 is not reliably restricted by the retainer 644, and the check valve ceases to function reliably.

Furthermore, as shown in FIG. 14, when the plunger 620 is pressed back into the plunger-accommodating hole 611, the plunger-biasing spring 630, which extends into the hollow portion 621 of the plunger, and part of which is located in the gap between the plunger 620 and the retainer 644, impedes the flow of oil from the high pressure chamber R to the outside of the tensioner through the leakage path between the circumferential surface of the plunger and the internal wall of the plunger-accommodating hole 611. As in the case of the tensioner of FIGS. 10-12, rapid changes in tension in the timing chain cannot be absorbed instantaneously.

As shown in FIG. 15, since a plurality of holes 644a on the side of the retainer are provided to replenish oil to the high pressure chamber R from the oil passage 641a in the ball seat 641, when excessive oil is supplied from the external oil supply through the ball seat and holes 644a to the high pressure chamber R, changes in the tension of the timing chain are generated.

The plunger-biasing spring 630 in the gap between the plunger 620 and the retainer 644 impedes flow of oil from the high pressure chamber R through the gap between the plunger and the wall of the plunger-accommodating hole 611 to the outside of the housing. An increase in tension in the timing chain causes the plunger 620 to be pressed back into the plunger-accommodating hole 611, and, since leakage of oil to the outside the housing is impeded by the plunger-biasing spring 630, the pressure inside of the high pressure chamber R becomes abnormally high, and the plunger 620 does not move as it should.

Accordingly, an object of the invention is to solve the above-mentioned problems and to provide a hydraulic tensioner in which a bell-shaped retainer and a ball seat are reliably incorporated and fixed into check valve unit, the check valve unit functions reliably, and oil from the external oil supply oil leaks between the plunger and the wall of the plunger-accommodating hole to the outside of the housing without being influenced by the plunger-biasing spring.

SUMMARY OF THE INVENTION

The hydraulic tensioner according to the invention comprises a housing having a plunger-accommodating hole having an cylindrical wall, and a plunger slidable in the plunger-accommodating hole, and protruding therefrom, for applying tension to a traveling transmission chain. The plunger has a cylindrical hollow portion, and the hollow portion of the plunger and the plunger-accommodating hole together define a high pressure oil chamber. A plunger-biasing spring, disposed in the high pressure oil chamber, the spring urges the plunger in its protruding direction. A check valve unit, incorporated in the housing and protruding into the high pressure oil chamber, allows flow of oil from an oil supply into the high pressure oil chamber, but blocks reverse flow of oil out of the high pressure oil chamber. The check valve unit includes a ball seat having an outer circumferential surface and an internal oil passage communicating with an external oil supply, a check ball engageable with the ball seat, a ball-biasing spring urging the check ball into engagement with the ball seat, and a bell-shaped retainer restricting the movement of the check ball.

The bell-shaped retainer comprises a ball-surrounding portion, which contains the ball-biasing spring and surrounds the check ball while allowing the check ball to move toward and away from the ball seat. The retainer also includes a plurality of branched leg portions which extend from the ball surrounding portion. The retainer leg portions are resiliently fitted onto the outer circumferential surface of the ball seat. Oil induction slots formed between the leg portions supply oil from the oil passage in the ball seat to the high pressure oil chamber and allow oil to flow from the high pressure oil chamber through a leakage path between the plunger and the cylindrical wall of the plunger-accommodating hole to the outside of the housing.

In a preferred embodiment of the hydraulic tensioner a flange is formed on the ends of the branched leg portions of the retainer remote from the ball-surrounding portion of the retainer. The plunger-biasing spring is seated on this flange.

Preferably, the branched leg portions on both sides of each oil induction slot are connected by an arc-shaped end of the slot.

Preferably, the ball-surrounding portion of the retainer is formed with a peak having a dimple, and the ball-biasing spring is seated on the dimple.

In the invention, the leg portions of the retainer expand and are press-fit onto the outer circumferential surface of the ball seat. Therefore, the bell-shaped retainer is reliably fixed to the ball seat. Thus, even if the plunger slides rapidly as a result of changes in tension of the timing chain, the position of the retainer does not shift along the ball seat, and movement of the check ball in the check valve unit is reliably restricted.

Furthermore, because the oil-induction slots of the bell-shaped retainer are formed between the leg portion of the retainer, even when the plunger-biasing spring intervenes in the gap between the plunger and the retainer, oil in the high pressure chamber flows through the oil-induction slot of the retainer, and leaks to the outside the housing between the plunger and the plunger-accommodating hole. Therefore, rapid changes in the tension of the timing chain can be absorbed instantaneously, and optimum hydraulic balance in the tensioner housing can be realized.

Furthermore, when excessive oil is supplied from the external oil supply, the oil flows through the plurality of oil induction slots into the high pressure chamber. Consequently, even when the plunger-biasing spring is disposed in the gap between the plunger and the retainer, part of the excessive oil supplied to the ball seat leaks to the outside of the housing between the plunger and the inner wall of the plunger-accommodating hole. Thus, excessive supply of oil into the high pressure chamber is suppressed and an optimum hydraulic balance in the housing can be realized When a flange of the ball retainer formed at the ends of the retainer legs, seats the plunger-biasing spring, the plunger biasing spring presses the bell-shaped retainer against the bottom of the plunger accommodating hole, and the optimum mounting position for the bell-shaped retainer can be maintained over a long period of time.

Furthermore, when adjacent branching legs of the retainer are connected through an arc of the oil induction slot, elastic force generated in the retainer leg portions of the bell-shaped retainer are dispersed by the arc-shaped portions of the oil-induction slots. Thus, cracks and the like, which are liable to be generated when the retainer leg portions of the bell-shaped retainer are press-fitted to an outer circumferential surface of the ball seat, a high degree of strength of the bell-shaped retainer can be maintained over a long period of time.

Finally when a spring seating dimple seats the ball biasing spring, at a peak end of the ball-surrounding portion, the ball-biasing spring can be seated in a stable and reliably positioned manner, and biases the check ball toward a valve seat for the ball seat. Thus the check ball can exhibit a reliable check valve function in a ball surrounding portion of the bell-shaped retainer.

DETAILED DESCRIPTION OF THE PREFERRED EMBODIMENTS

In general, the tensioner according to the invention is similar to a conventional hydraulic tensioner, but characterized by a check valve structure having a bell-shaped retainer that includes a plurality of branched leg portions. The bell-shaped retainer comprises a ball-surrounding portion, which contains a ball-biasing spring and surrounds a check ball while allowing the check ball to move toward and away from the ball seat. The branched leg portions extend from the ball surrounding portion, and are resiliently fitted onto the outer circumferential surface of a ball seat. Oil induction slots, formed between the leg portions, supply oil from the oil passage in the ball seat to the high pressure oil chamber and allow oil to flow from the high pressure oil chamber through a leakage path between the plunger and the cylindrical wall of the plunger-accommodating hole to the outside of the housing. With the above structure, even if a rapid change in tension of the timing chain occurs, and even if there is an excessive supply of oil to the tensioner from an external oil supply, the oil leaks to the outside of the housing through between the plunger and the plunger accommodating hole without being influenced by the plunger-biasing spring. Consequently an the optimum hydraulic balance in tensioner housing can be realized.

Optionally, the tensioner of the invention can be a ratchet-type tensioner having a rack on its plunger, and a pawl mounted on its housing for cooperation with the rack to limit retraction of the plunger.

Figure 1:
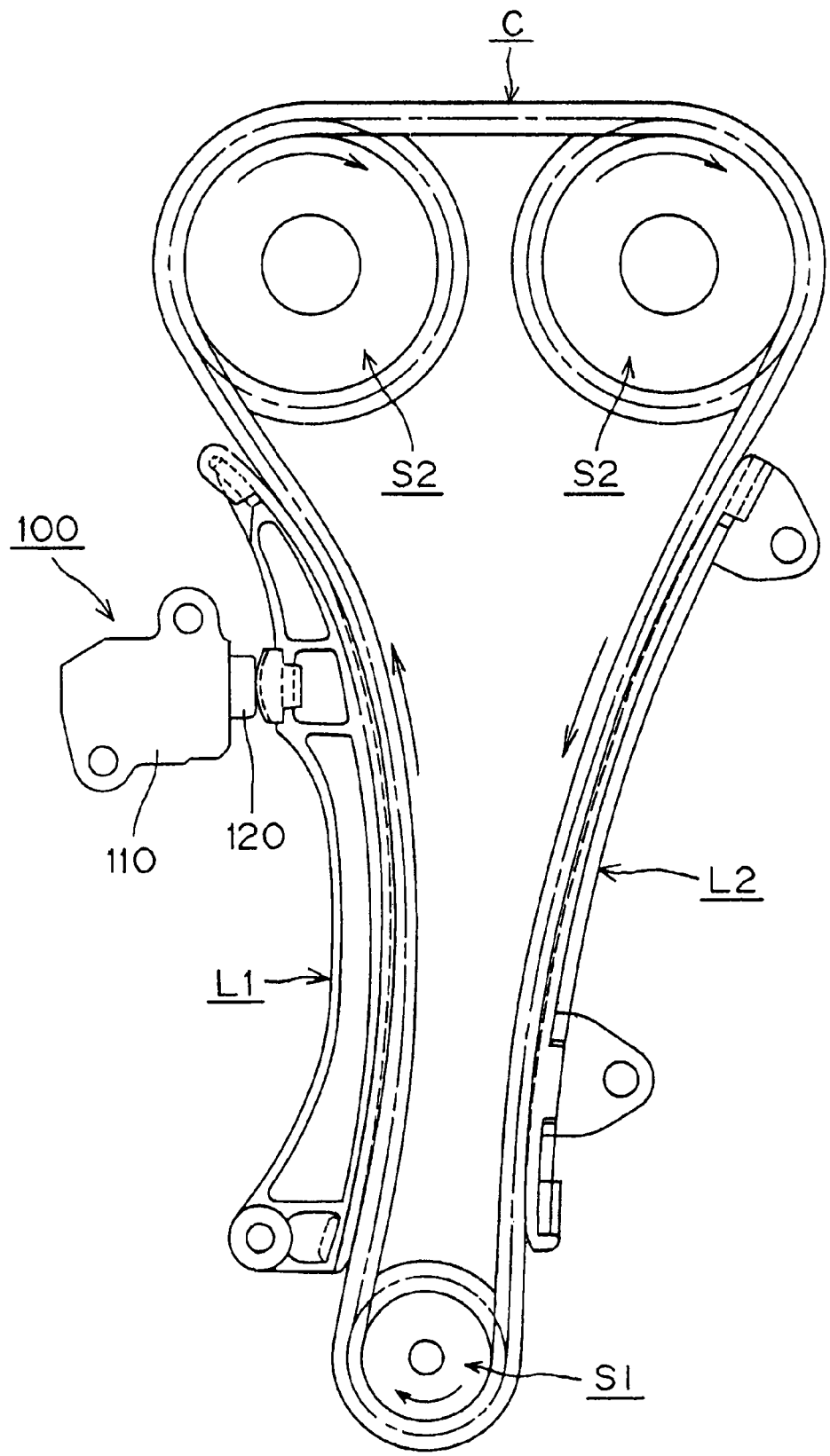
FIG. 1 is a schematic front elevational view of a timing drive incorporating a hydraulic tensioner according to the invention.
Figure 2:
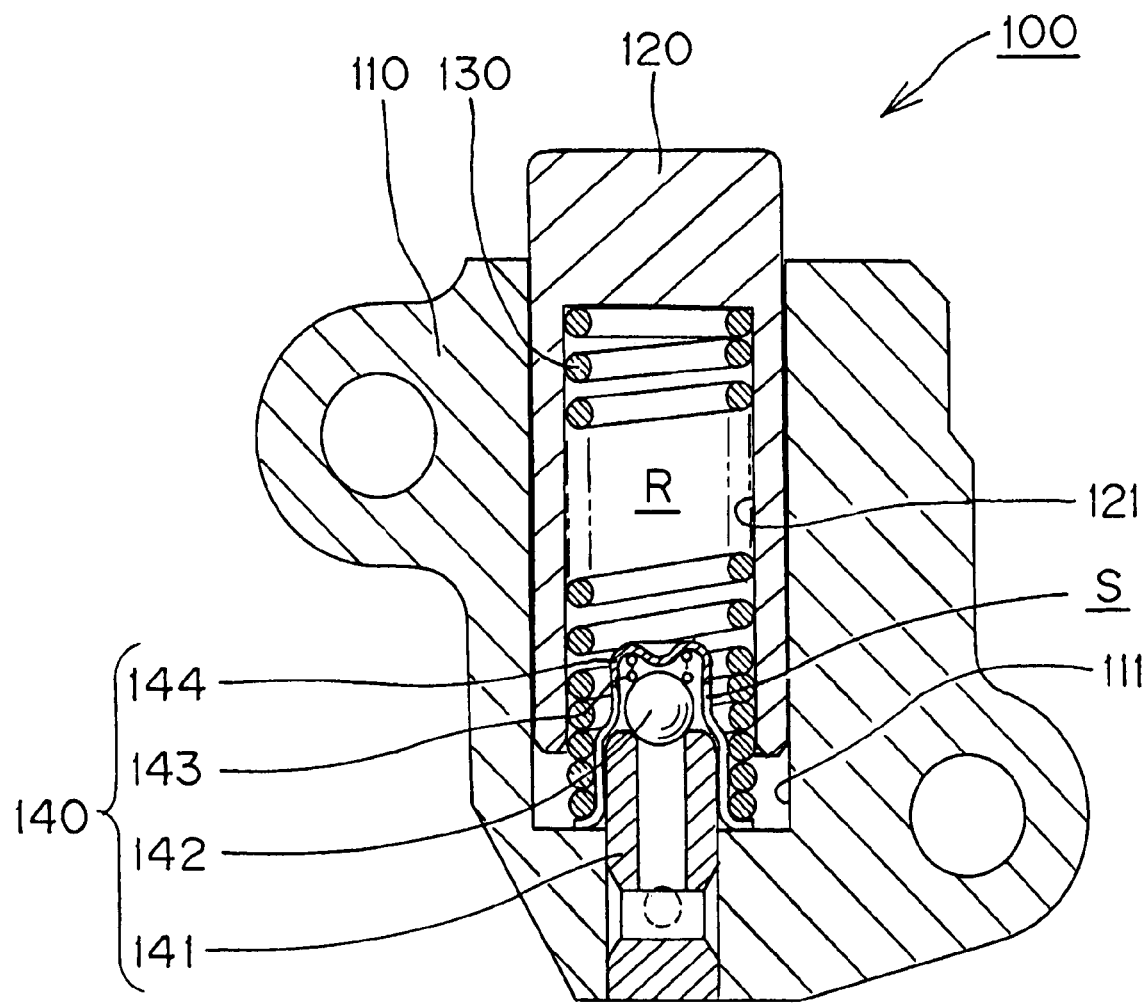
FIG. 2 is a cross-sectional view of the hydraulic tensioner according to a first embodiment of the invention.

As shown in FIGS. 1 and 2, a hydraulic tensioner 100, according to a first embodiment of the invention, is mounted on an engine on the slack side of a timing chain C which is driven by a crankshaft sprocket S1, and arranged to drive camshaft sprockets S2. The plunger 120 of the tensioner 100 slidably protrudes from the housing 110, and presses against a back surface of a pivoted lever L1, also supported on the engine. The plunger presses against the lever at a location remote from the lever's pivot axis to apply tension to the timing chain C. A fixed guide L2 is in sliding contact with the tension side of the timing chain C. The chain moves, and the sprockets rotate, in the directions indicated by arrows in FIG. 1.

As shown in FIG. 2, the plunger 120, the exterior of which is cylindrical is slidable in a plunger-accommodating hole 111 formed in the housing 110. The plunger is formed with a cylindrical hollow portion 121, one end of which is open to receive a plunger-biasing spring 130, which urges the plunger 120 in the protruding direction. The front end of the plunger 120 always protrude outside the plunger-accommodating hole 111. A high pressure chamber R is formed by the plunger accommodating hole 111 and the cylindrical hollow portion 121 of the plunger. The high pressure chamber R is filled with oil supplied through a check valve unit 140 from an oil supply, which is typically an oil pump incorporated into, and driven by, the engine.

Figure 6:
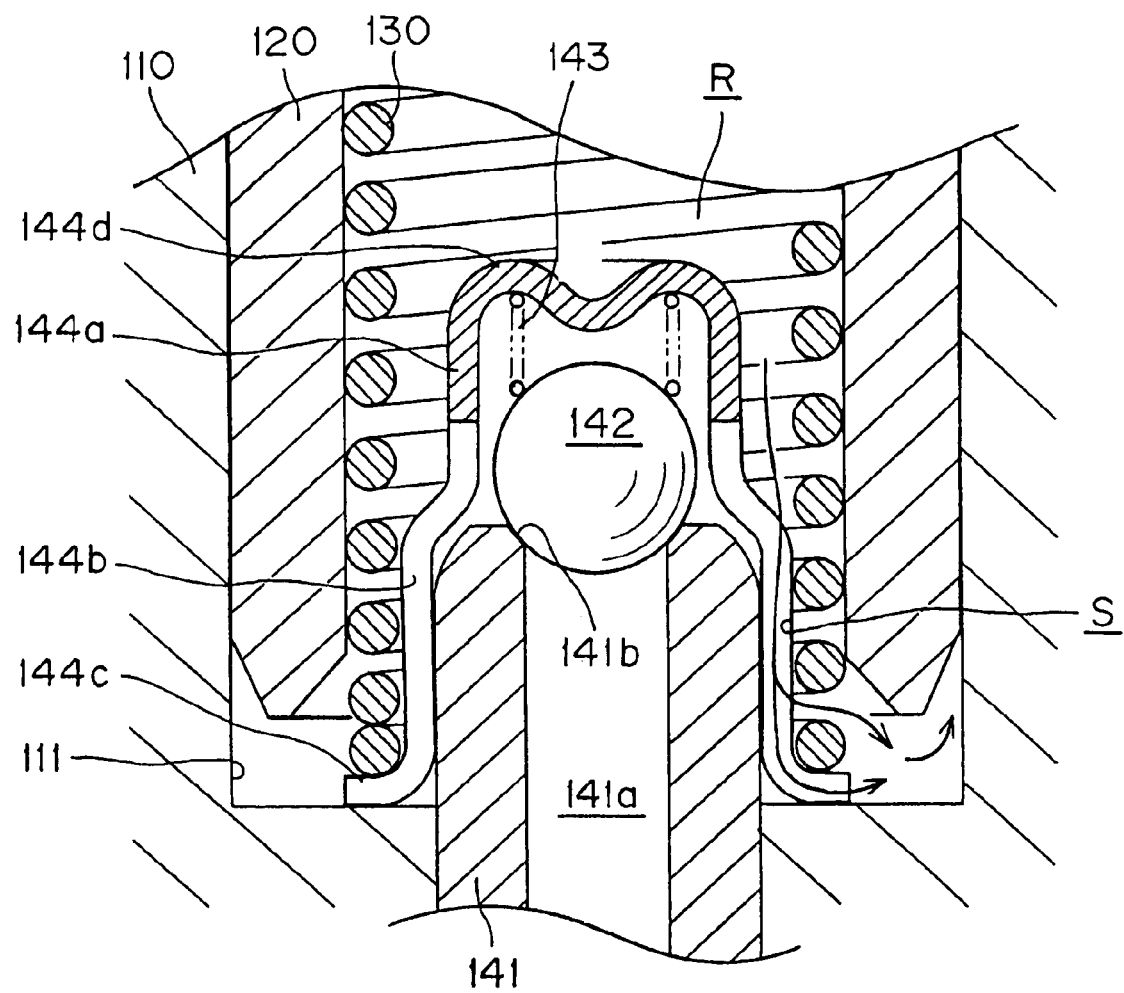
FIG. 6 is an enlarged cross-sectional view of a portion of a tensioner incorporating the retainer of FIGS. 2-4, showing the flow of oil when the check ball is seated on the ball seat.

The check valve unit 140, which is incorporated into the tensioner housing and protrudes into the high pressure chamber R, blocks reverse flow of oil from the high pressure chamber R. As shown in FIG. 2, the check valve unit 140 includes, a ball seat 141, which has an oil passage 141a for communicating with an external oil supply to replenish oil in the tensioner, a check ball 142 facing a valve seat (141b as shown in FIG. 6.) at the end of the ball seat 141, a ball biasing spring 143, which presses the check ball 142 against the ball seat 141, and a bell-shaped retainer 144, which supports the ball-biasing spring 143 and also restricts the movement of the check ball 142.

When an impact force acts on the front end of the plunger 120 as a result of a change in tension in the timing chain C, the lever L1 rapidly presses the plunger 120 in the retracting direction, against the biasing force exerted by the plunger-biasing spring 130. When the plunger is pressed in the retracting direction, the pressure of the oil in the high pressure chamber R is increased, and the check ball 142 of the check valve unit 140 is pressed onto the ball seat 141 so that reverse flow of oil from the high pressure chamber R to the oil passage 141a (FIG. 6) in the ball seat 141 is prevented.

Figure 3:
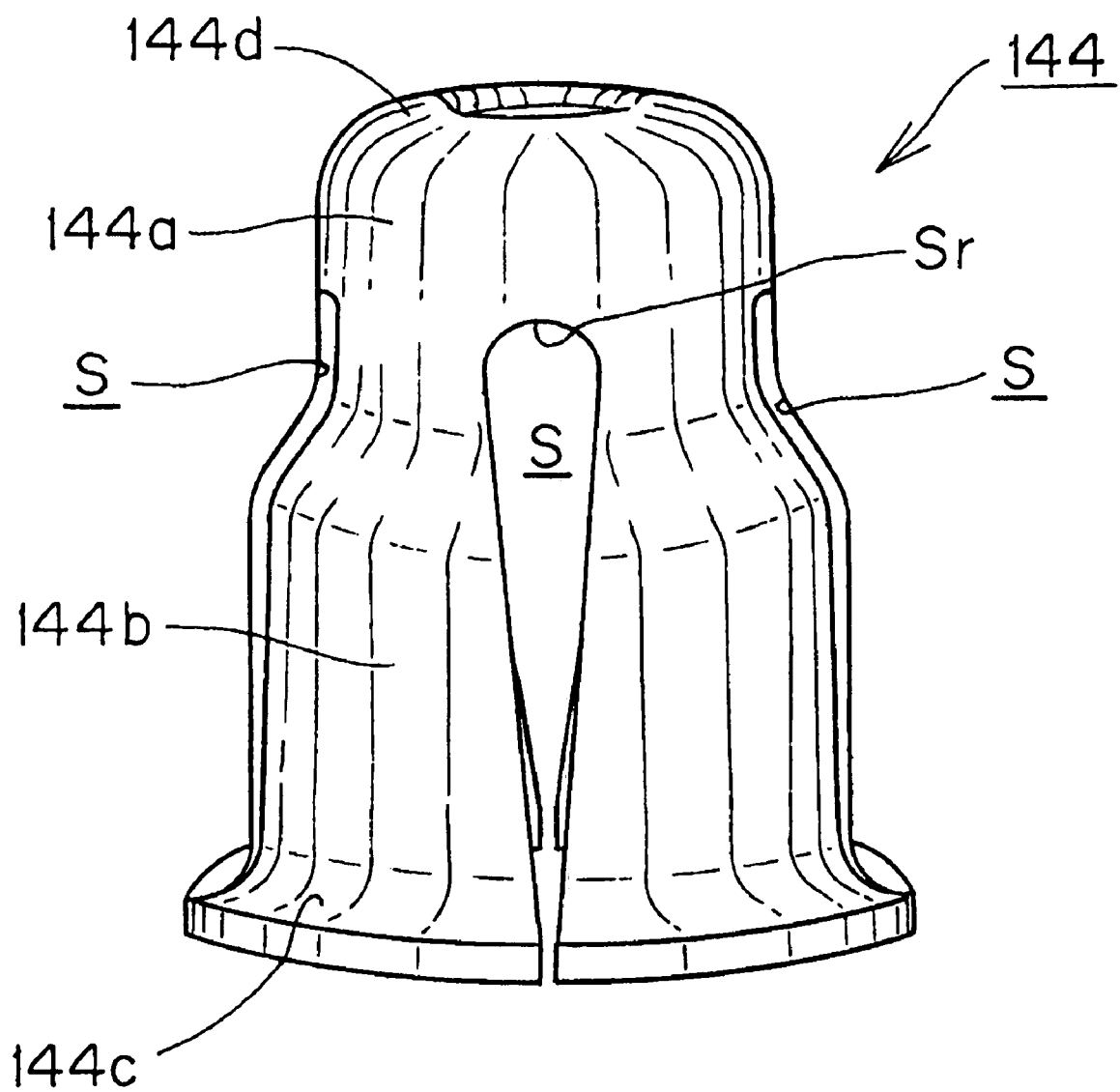
FIG. 3 is an enlarged perspective view of a bell-shaped check ball retainer used in the hydraulic tensioner of FIG. 2.
Figure 4:
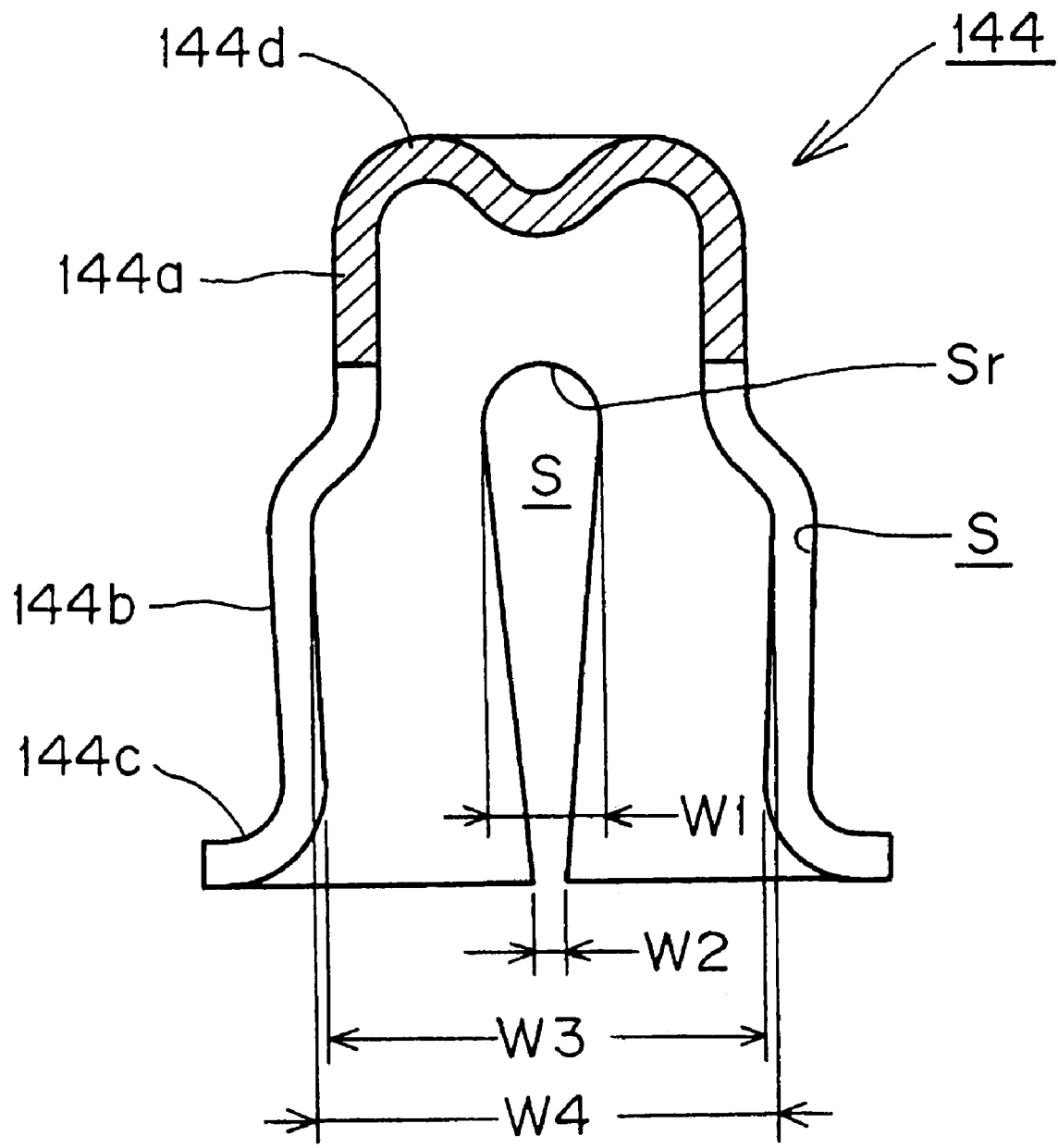
FIG. 4 is a cross-sectional view of the bell-shaped retainer of FIG. 3.
Figure 5:
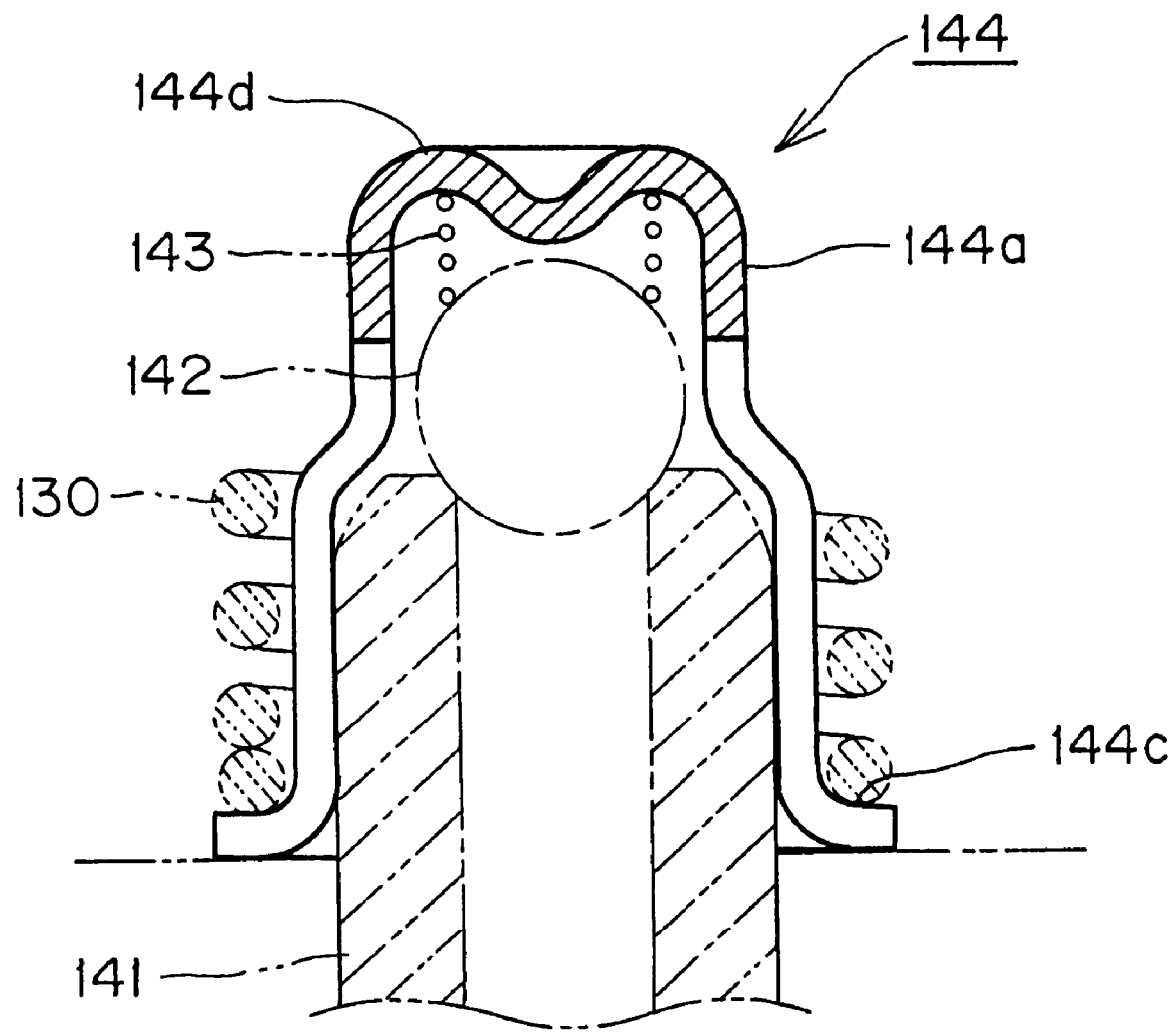
FIG. 5 is a cross-sectional view showing the bell-shaped retainer of FIGS. 2-4, mounted on a ball seat.
Figure 7:
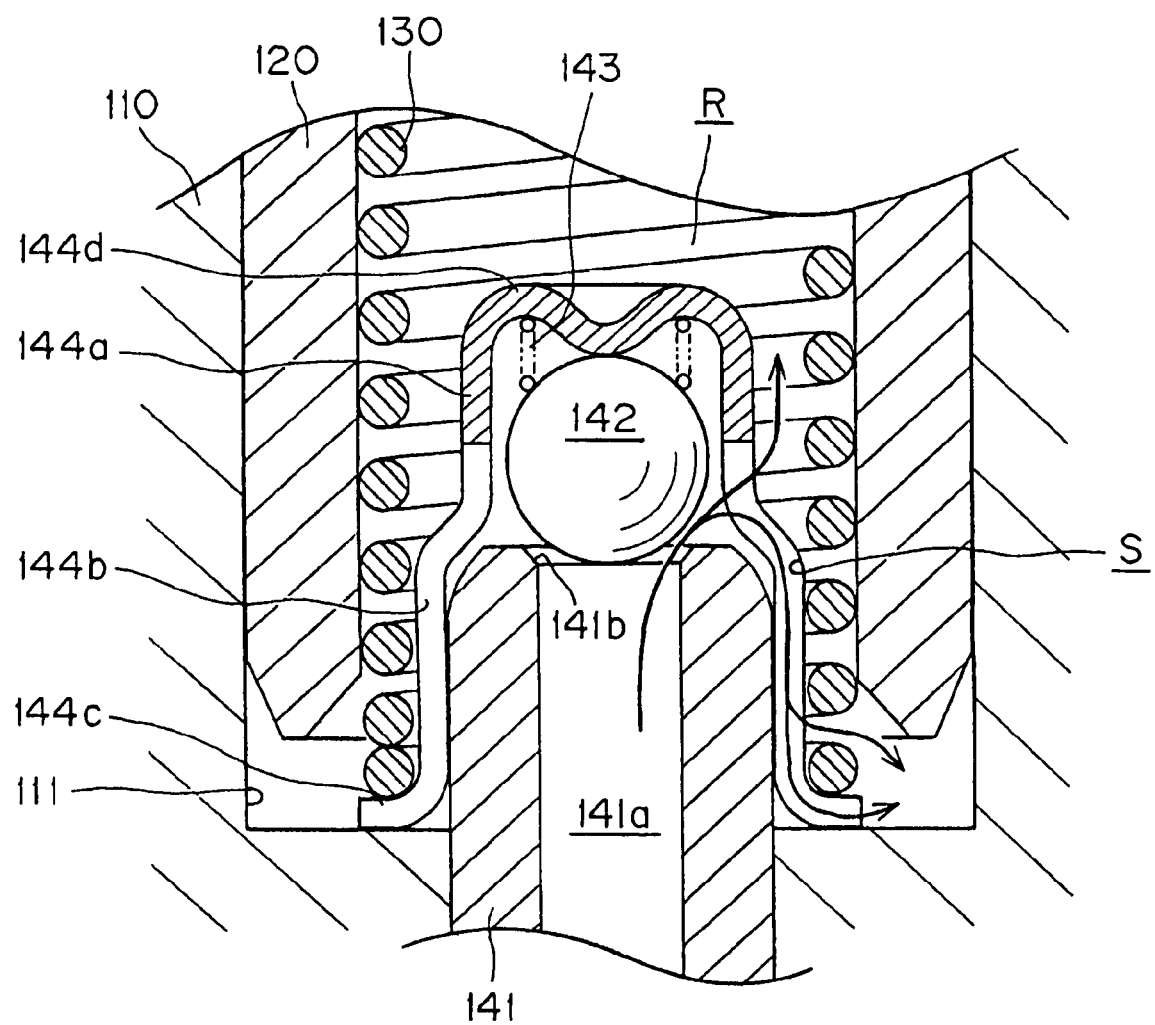
FIG. 7 is an enlarged cross-sectional view of a portion of a tensioner incorporating the retainer of FIGS. 2-4, showing the flow of oil when the check ball is separated from the ball seat.

As shown in FIGS. 3 and 4, the bell-shaped retainer 144 of the check valve unit 140 comprises a ball-surrounding portion 144a. The ball-surrounding portion supports the ball-biasing spring 143 (FIG. 1), and at the same time allows the check ball 142 to move freely within a limited range from a position in which it is in contact with the ball seat, as shown in FIGS. 5 and 6, to a position in which it is displaced from the ball seat, as shown in FIG. 7. Four branched leg portions 144b (FIGS. 3 and 4), of the retainer extend from the ball-surrounding portion 144a. The leg portions 144b expand resiliently as the retainer is press-fit onto the outer circumferential surface of the ball seat 141.

Adjacent leg portions 144b of the retainer are separated from each other by tapered oil induction slots S. Oil flowing through these slots replenishes oil in the high pressure chamber R from the oil passage 141a in the ball seat. These slots between the leg portions of the retainer also allow oil to leak from the high pressure chamber, through a narrow space between the outer circumferential surface of the plunger and the inside wall of the plunger-accommodating hole 121, to the outside of the housing.

FIG. 4 shows the configuration of the bell-shaped retainer 144 before it is mounted on the ball seat 141. W1 denotes the maximum width of the tapered oil induction slot S, and W2 denotes the minimum slot width. W3 denotes the spacing of opposite retainer leg portions 144b before mount, and W4 denotes the spacing of the same opposed leg portions after mounting of the retainer on the ball seat. When the retainer is mounted on the ball seat, the inner parts of its legs assume an interrupted, circular, cylindrical configuration conforming to the outer circumferential surface of the ball seat, and dimension W4 is the same as the inner diameter of the circular, cylindrical configuration of the leg portion of the retainer when it is mounted.

As shown in FIG. 5, when the retainer is mounted on the ball seat, four retainer leg portions 144b expand resiliently as the retainer is press-fit onto the outer circumferential surface of the ball seat 141, so that the bell-shaped retainer 144 is reliably secured to the ball seat 141. Even if the plunger 120 slides back and forth rapidly with changes in tension of the timing chain, the position of the retainer on the ball seat does not shift, and the movement of the check ball 142 is reliably restricted.

Since the oil induction slots S in the bell-shaped retainer 144 are formed between adjacent retainer leg portions 144b as shown in FIG. 4, when tension in the timing chain causes the plunger to be pressed back into the plunger-accommodating hole 111, the check valve closes, even though the plunger biasing spring 130 intervenes in the gap between the plunger 120 and the bell-shaped retainer 144 as shown in FIG. 6, the oil in the high pressure chamber R can flow through the slots, and leak to the outside of the housing through a leakage path between the outer circumferential surface of the plunger and the inner wall of the plunger-accommodating hole. Thus, a rapid change in the tension of the timing chain can be absorbed instantaneously, and an optimum oil pressure balance in the housing can be realized.

Furthermore, when, excessive oil is supplied from the external oil supply through the ball seat 141, so that the check ball 142 separates from the valve seat 141b, as shown in FIG. 7, the oil flows through the four oil induction slots S into the high pressure chamber R. Even though the plunger-biasing spring 130 intervenes in the gap between the plunger 120 and the bell-shaped retainer 144, a part of excess oil supplied through the ball seat 141 can leaks to the outside of the housing through the leakage path between the outer circumferential surface of the plunger and the inner wall of the plunger-accommodating hole. Thus, excessive supply of oil into the high pressure chamber R is suppressed so that an optimum hydraulic balance in the housing 110 can be realized.

In the check valve unit 140, a spring seating flange 144c is formed at the ends of the leg portions 144b remote from the ball-surrounding portion 144a. The plunger biasing spring 130 is seated on the flange 144c. Thus, the plunger biasing spring 130 presses the bell-shaped retainer 144 onto the bottom of the plunger accommodating hole 111, so that the optimum mounting position of the retainer 144 is maintained.

As shown in FIG. 4, the leg portions 144b of the bell-shaped retainer 144 are in the form of branches connected by arc-shaped portion Sr of the oil induction slots S. Stress generated in the retainer leg portions as they expand when the retainer is fitted onto the ball seat is dispersed by the arc-shaped portions Sr of the oil-induction slots S. Cracks and the like, which are liable to be generated when the retainer leg portions 144b expand as the retainer is press-fit onto the outer circumferential surface of the ball seat 141, are avoided because of the arc-shaped configuration of the ends of the slots. Thus, the strength of the bell-shaped retainer 144 can be maintained for a long period of time.

As shown in FIG. 5, an annular dimple 144d, provided at a peak end of the ball surrounding portion 144a, reliably and stably seats the ball-biasing spring 143, which biases the check ball 142 toward the valve seat. The seating of the ball-biasing spring on the dimple ensures that the check ball 142 functions reliably as a check valve within the ball surrounding portion 144a of the retainer 144.

In the hydraulic tensioner 100, the retainer leg portions ensure the retainer 144 is secured to the ball seat 141, and the check valve operates reliably. Because of the oil induction slots formed between the legs of the retainer, even if a rapid change in tension occurs in the timing chain, or excessive oil is supplied from the external oil supply, the oil can leak to the outside the housing through a path between the plunger and the wall of the plunger-accommodating hole without being impeded by the plunger-biasing spring 130. Therefore, optimum oil pressure balance in the housing 110 can be realized.

Figure 8:
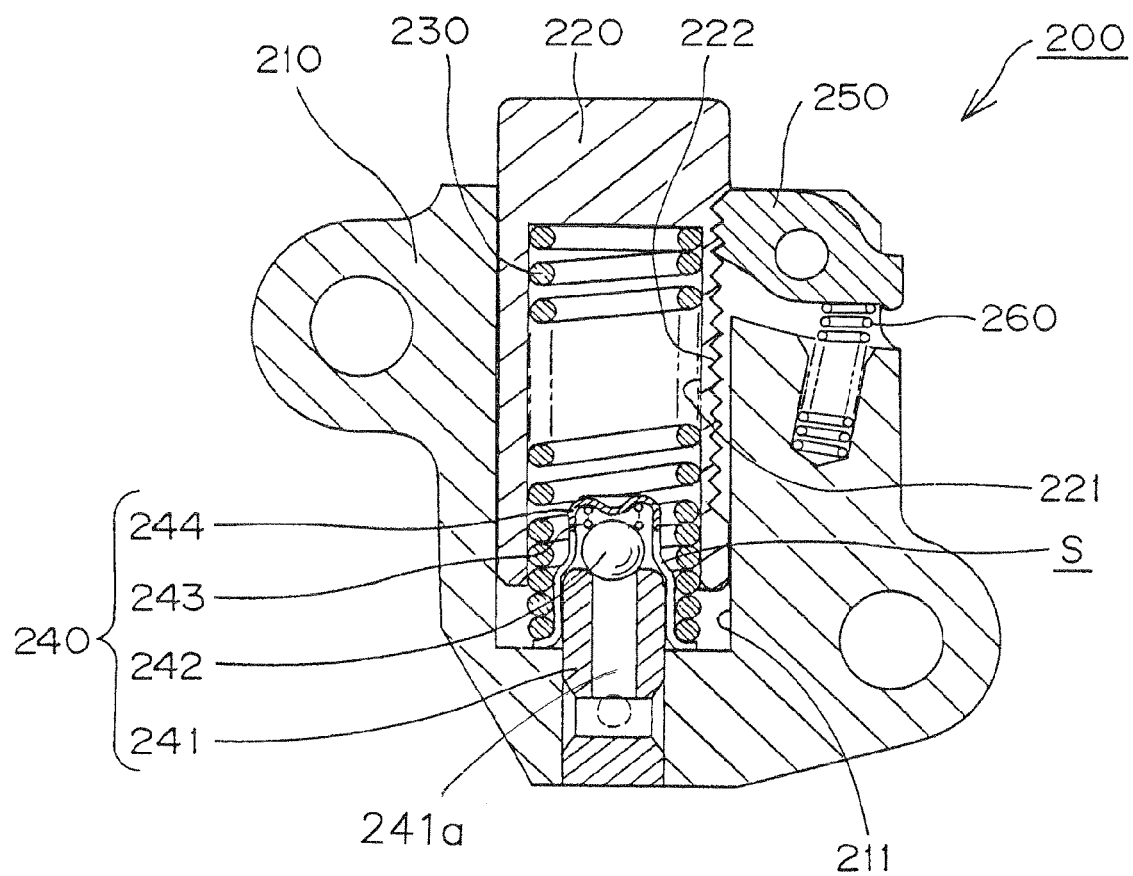
FIG. 8 is a cross-sectional view of the hydraulic tensioner according to a second embodiment of the invention.
Figure 9:
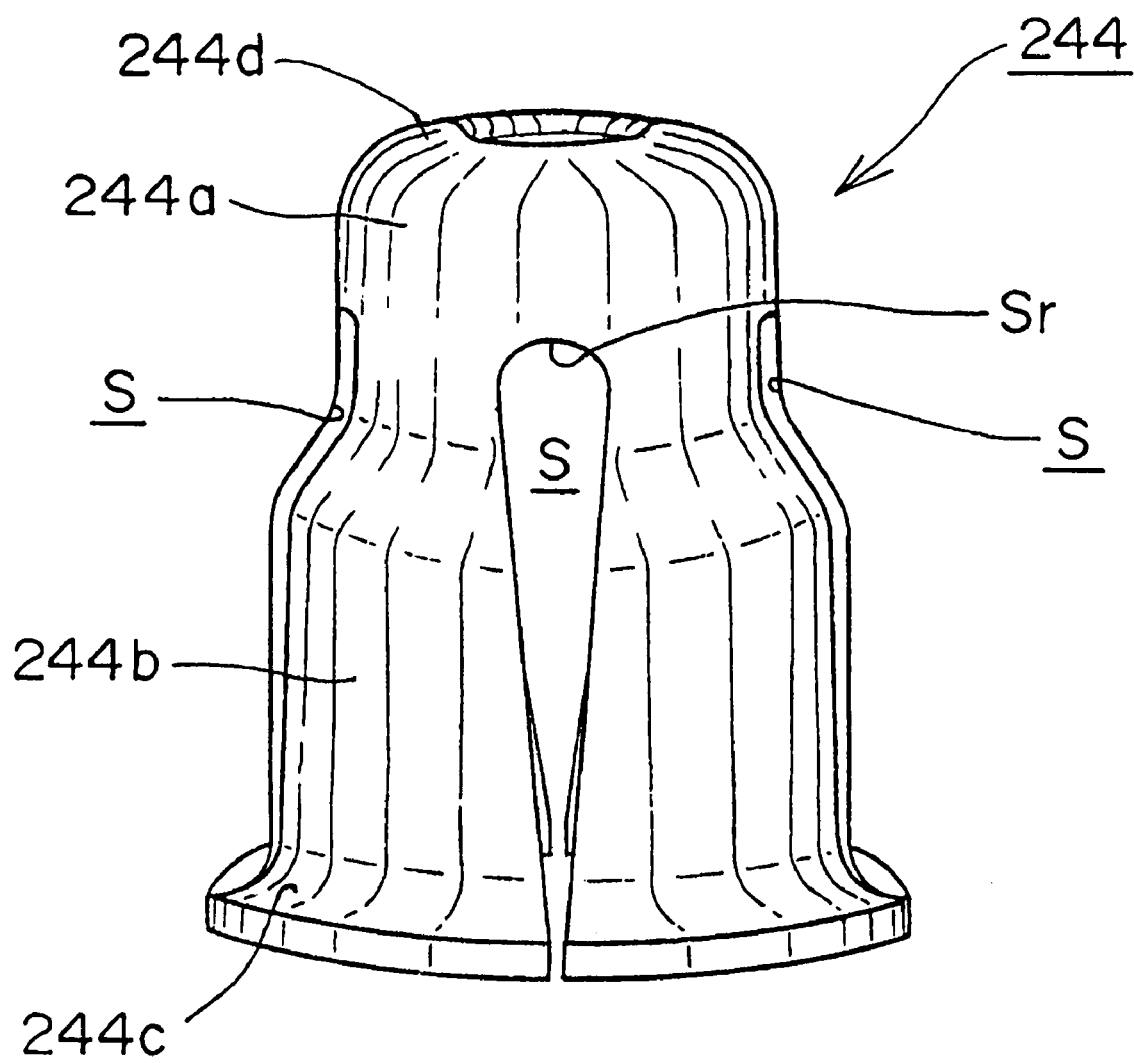
FIG. 9 is an enlarged perspective view of a bell-shaped retainer used in the hydraulic tensioner of FIG. 8.
Figure 10:
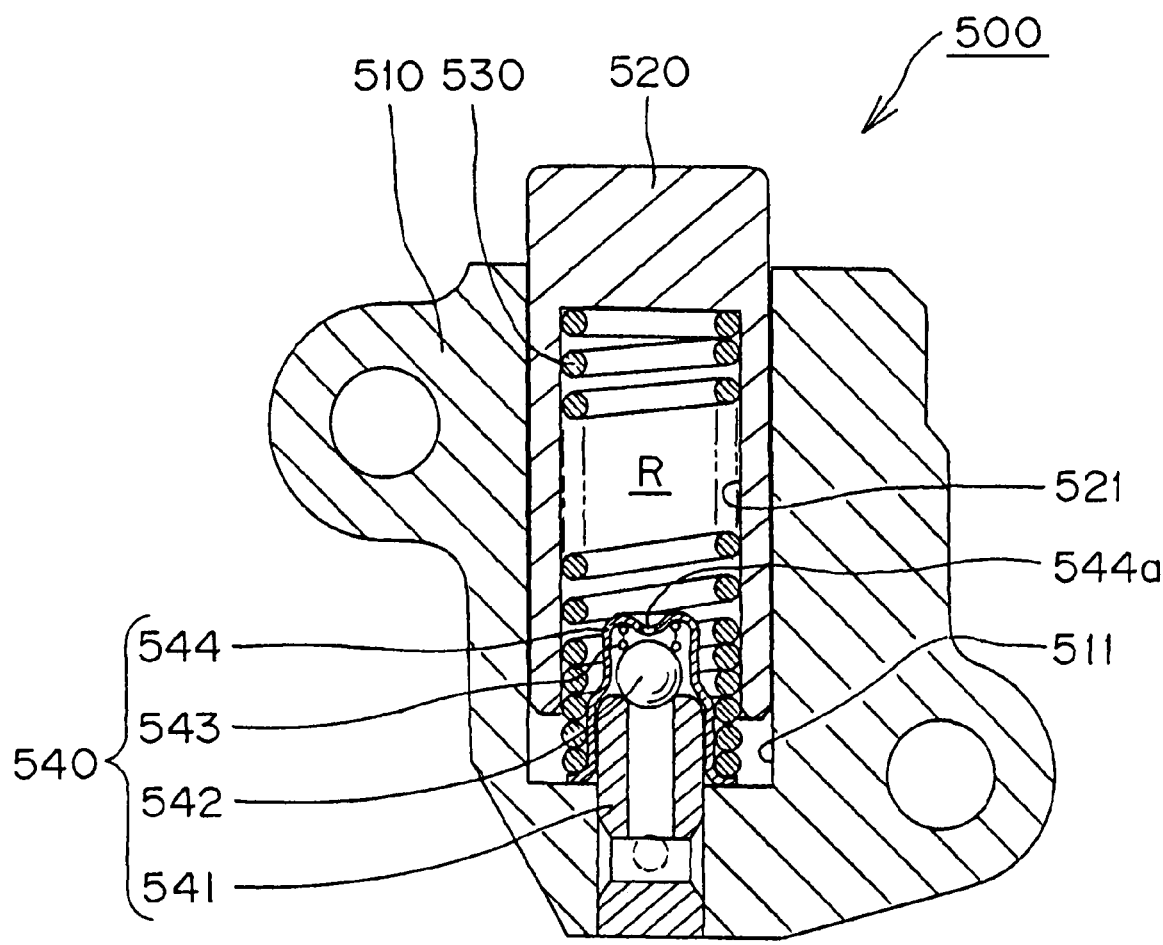
FIG. 10 is a cross-sectional view of a conventional hydraulic tensioner.
Figure 11:
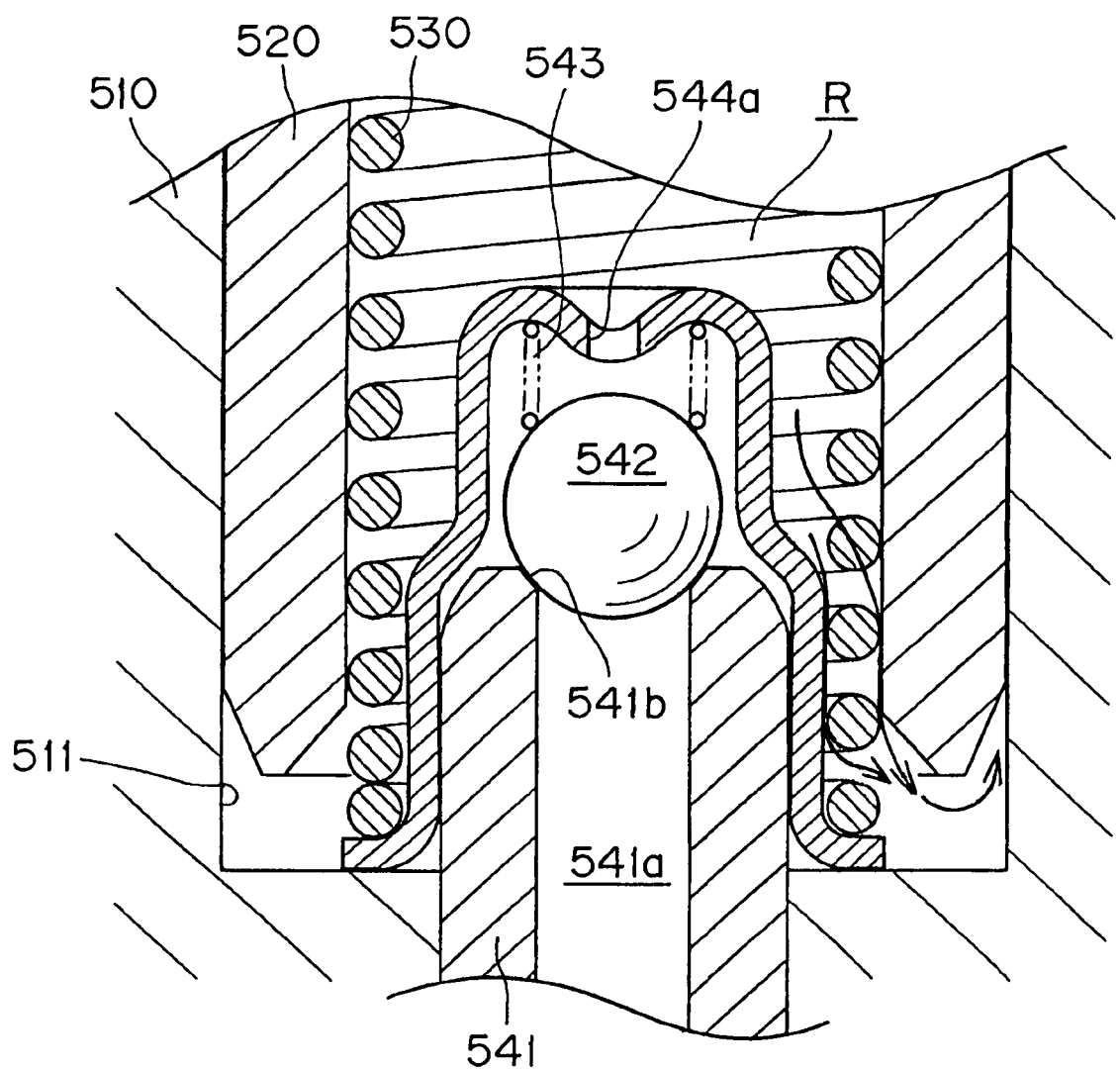
FIG. 11 is an enlarged cross-sectional view of a portion of a tensioner incorporating the conventional retainer of FIG. 10, showing the flow of oil when the check ball is seated on the ball seat.
Figure 12:
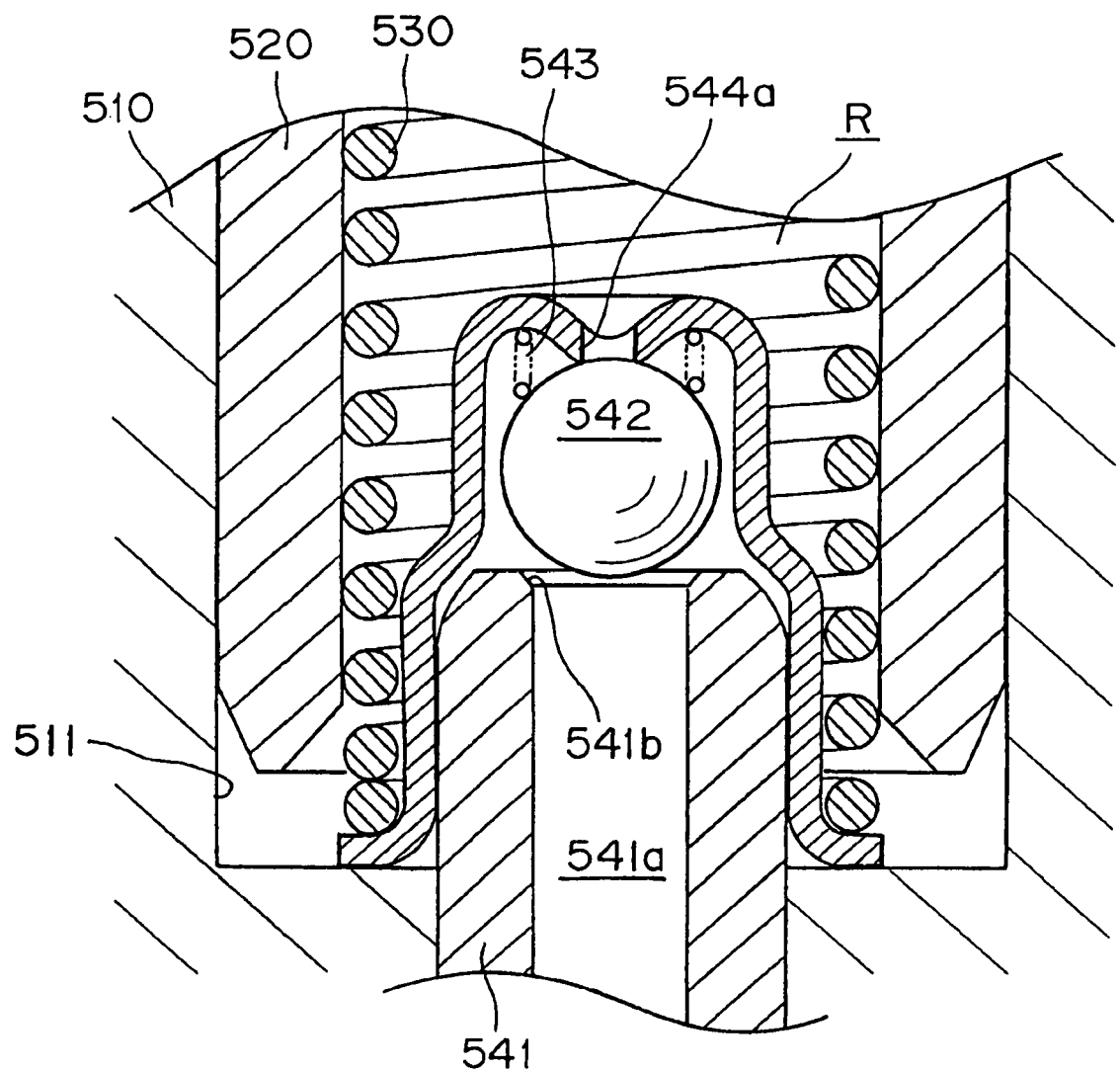
FIG. 12 is an enlarged cross-sectional view of a portion of a tensioner incorporating the conventional retainer of FIG. 10, showing the flow of oil when the check ball is separated from the ball seat.
Figure 13:
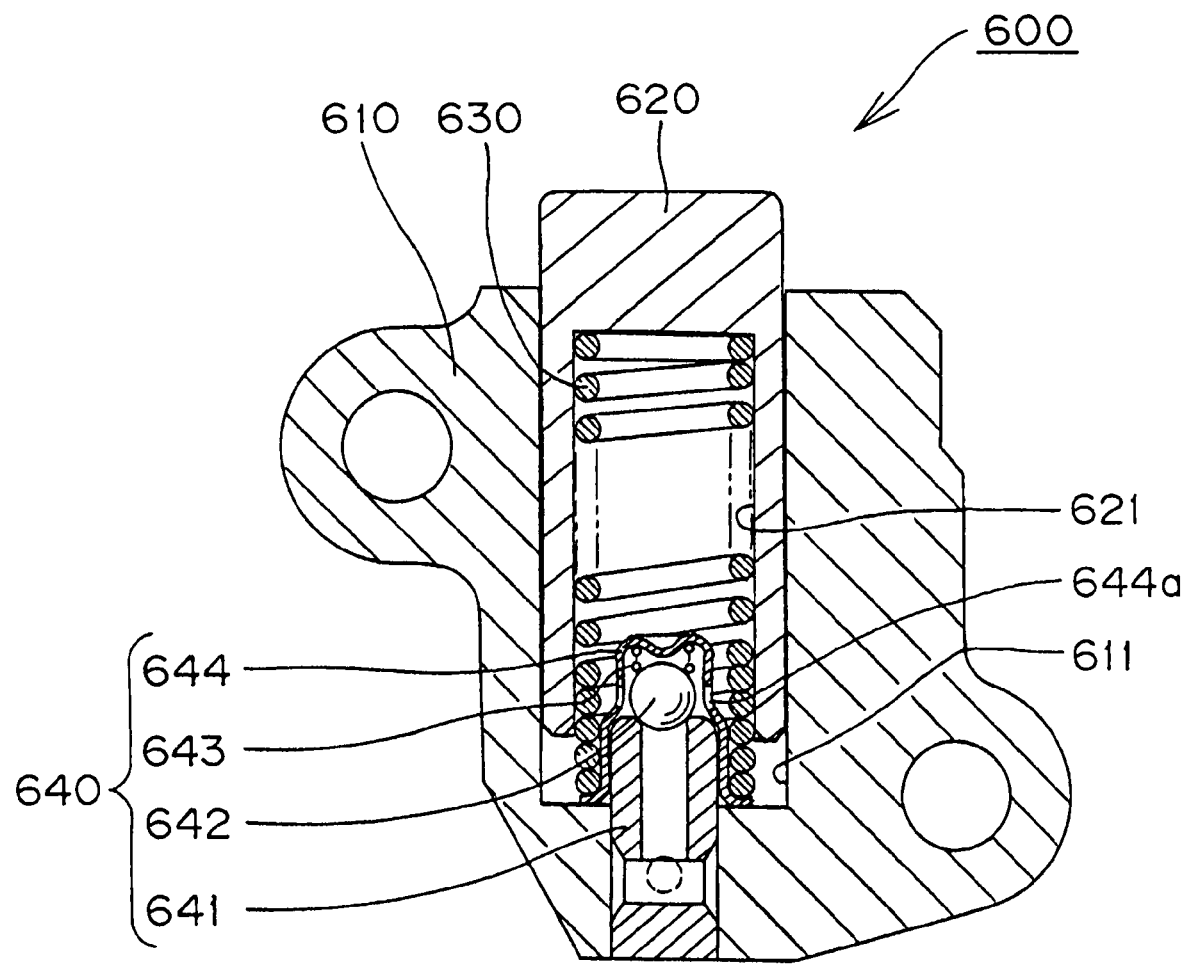
FIG. 13 is a cross-sectional view of another conventional hydraulic tensioner.
Figure 14:
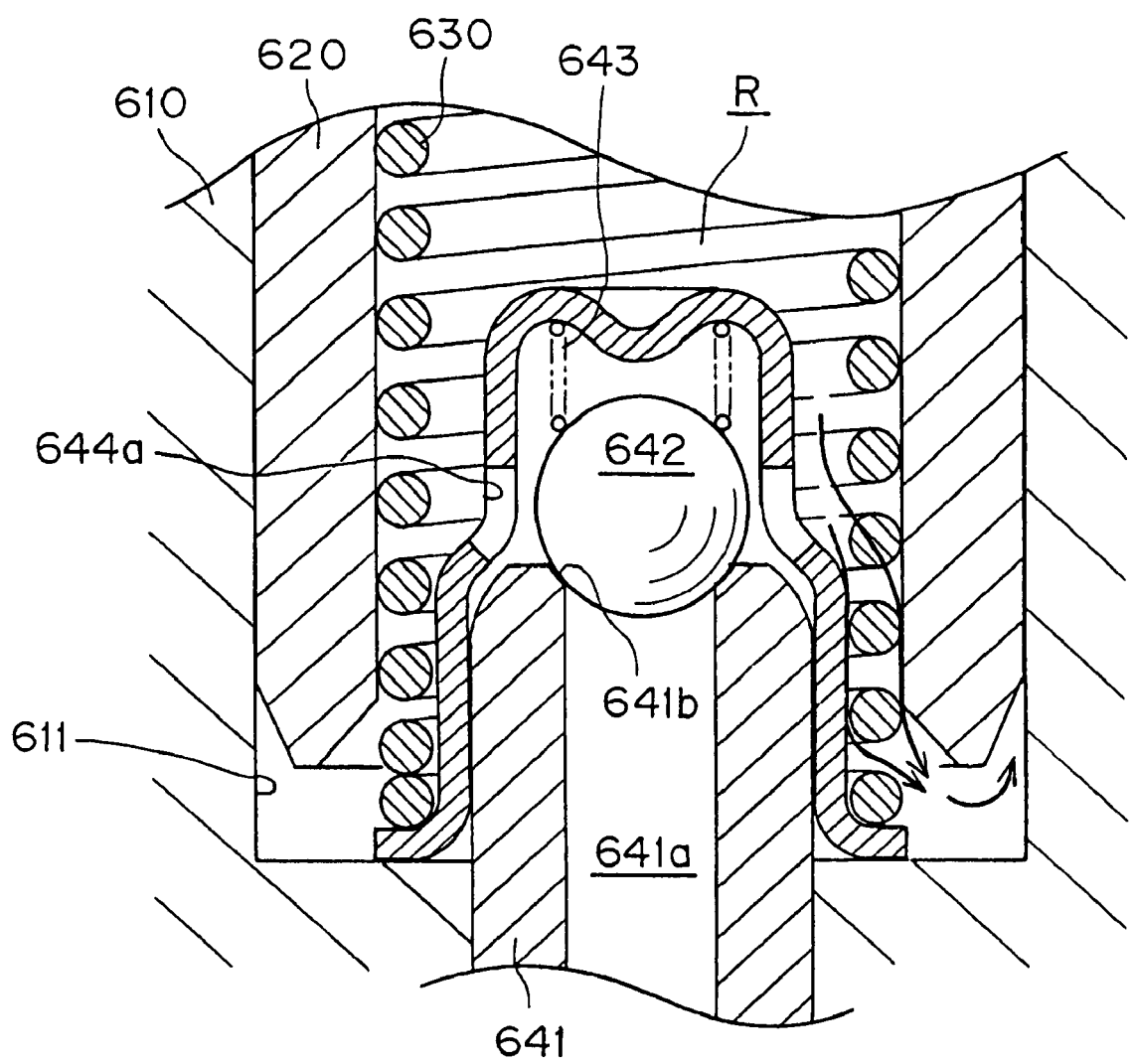
FIG. 14 is an is an enlarged cross-sectional view of a portion of a tensioner FIG. 13, showing the flow of oil when the check ball is seated on the ball seat.
Figure 15:
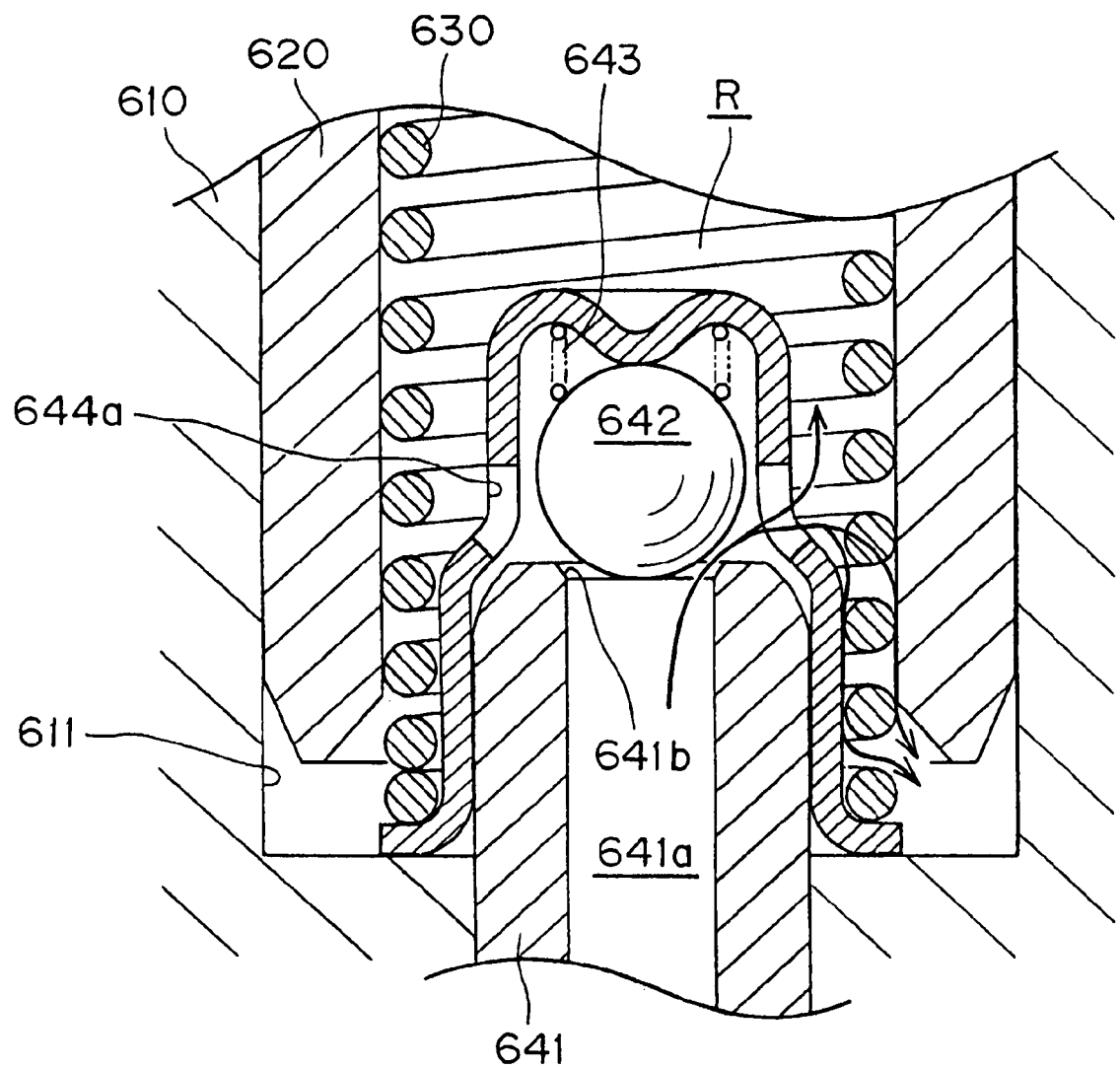
FIG. 15 is an is an enlarged cross-sectional view of a portion of a tensioner FIG. 13, showing the flow of oil when the check ball is separated from the ball seat.

In the embodiment shown in FIGS. 8 and 9, the hydraulic tensioner 200, is similar to the tensioner shown in FIG. 1, but is different from the above-described hydraulic tensioner 100 in that it includes a ratchet mechanism in which engagement between a rack 222 formed on a plunger 220, slidable in a plunger-accommodating hole 211, and a ratchet pawl 250 pivoted on the tensioner housing 210 blocks retracting movement of the plunger. A ratchet biasing spring 260 biases the ratchet pawl 250 toward the rack 222 of the plunger 220. Otherwise the configuration of the tensioner 200 is the same as that of the above-described hydraulic tensioner 100, and in FIGS. 8 and 9, parts that correspond to parts numbered in the 100s in FIGS. 1-7 are denoted by reference numbers that exceed the corresponding reference numbers in FIGS. 1-7 by one-hundred.

The bell-shaped retainer 244 of the check valve unit 240, has a ball-surrounding portion 244a, which supports a ball-biasing spring 243, and at the same time allows free movement of the check ball 242 toward and away for its ball seat, within a limited range. The ball-biasing spring is seated in an annular dimple 244d seen in FIG. 9, formed at the peak of the bell-shaped retainer 244. Four retainer leg portions 244b, which branched from the ball-surrounding portion 244a are resiliently expanded and press-fit onto the outer circumferential surface of the ball seat 241 as in the first embodiment.

As in the first embodiment, the legs of the retainer are separated from one another by tapered oil induction slots S, through which oil from oil passage 241a in the ball seat 241 is replenished to the high pressure chamber R, and through which oil flows to the leakage path between the plunger and the wall of the plunger-accommodating hole.

The hydraulic tensioner 200 of the second embodiment exhibits a ratcheting function by virtue of the rack 222 formed on the plunger 220 and the ratchet pawl 250 pivoted on the housing 210. As in the above-described hydraulic tensioner 100, the tapered oil induction slots S are formed between the branched retainer leg portions extending from the ball-surrounding portion 244a of the retainer 244. By virtue of the legs, which are formed with a flange 244c, the bell-shaped retainer 244 is reliably secured to the ball seat 241 and the check valve functions reliably. Even if a rapid change occurs in the tension of the timing chain, or excessive oil is supplied from the external oil supply, the oil will leak to the outside of the tensioner housing through the leakage path between the plunger and the internal wall of the plunger-accommodating hole without being impeded by the plunger biasing spring 230. Thus, an optimum oil pressure balance in the housing 210 can be realized.

What is claimed is:

1. A hydraulic tensioner comprising a housing having a plunger-accommodating hole having an cylindrical wall, a plunger slidable in said plunger-accommodating hole, and protruding therefrom, for applying tension to a traveling transmission chain, said plunger having a cylindrical hollow portion, the hollow portion of the plunger, and the plunger-accommodating hole together defining a high pressure oil chamber, a plunger biasing spring in said high pressure oil chamber, the spring urging said plunger in its protruding direction, and a check valve unit incorporated in said housing and protruding into said high pressure oil chamber, the check valve unit allowing flow of oil from an oil supply into said high pressure oil chamber but blocking reverse flow of oil out of said high pressure oil chamber, said check valve unit including a ball seat having a circular, cylindrical outer circumferential surface and an internal oil passage communicating with an external oil supply, a check ball engageable with said ball seat, a ball biasing spring urging said check ball into engagement with said ball seat, and a bell-shaped retainer restricting the movement of said check ball, wherein the bell-shaped retainer comprises a ball-surrounding portion, which contains said ball-biasing spring and surrounds the check ball while allowing the check ball to move toward and away from the ball seat, the retainer including a plurality of branched leg portions, which extend from said ball surrounding portion, the retainer leg portions being resilient and resiliently fitted onto the outer circumferential surface of the ball seat, and oil induction slots formed between the leg portions, the oil induction slots supplying oil from the oil passage in said ball seat to the high pressure oil chamber and allowing oil to flow from said high pressure oil chamber through a leakage path between the plunger and the cylindrical wall of the plunger accommodating hole to the outside of the housing, in which an outwardly protruding flange is formed on the ends of said branched leg portions remote from the ball-surrounding portion of the bell-shaped retainer, in which the leg portions of said bell shaped retainer, when in a relaxed condition, have diametrically opposed inwardly facing parts spaced from each other by a distance less than the diameter of the outer circumferential surface of the ball seat, and when said leg portions are in said relaxed condition, diametrically opposite parts of said flange, located outward with respect to said inwardly facing parts, are spaced from each other by a distance greater than the diameter of the outer surface of the ball seat whereby the retainer can be press-fit onto the ball seat, in which, when the retainer is resiliently fitted onto the outer circumferential surface of the ball seat, said opposed parts are spaced from each other by an amount equal to the diameter of the outer circumferential surface of the ball seat and inner parts of said leg portions have an interrupted, circular cylindrical configuration conforming to the outer circumferential surface of the ball seat, and in which the plunger-biasing spring is seated on said flange, whereby the retainer is held in place on the ball seat both by its press-fit relationship with the ball seat and by engagement of its flange by the plunger-biasing spring.

2. A hydraulic tensioner according to claim 1, in which branched leg portions on both sides of each said oil induction slot are connected by an arc-shaped end of the last-mentioned slot.

3. A hydraulic tensioner according to claim 1, in which the ball-surrounding portion of the retainer is formed with a peak having a dimple, and in which the ball-biasing spring is seated on said dimple.

4. A hydraulic tensioner according to claim 2, in which the ball-surrounding portion of the retainer is formed with a peak having a dimple, and in which the ball-biasing spring is seated on said dimple.

\* \* \* \* \*

UNITED STATES PATENT AND TRADEMARK OFFICE
CERTIFICATE OF CORRECTION

PATENT NO. : 7,713,155 B2  
APPLICATION NO. : 11/999230  
DATED : May 11, 2010  
INVENTOR(S) : Tsutomu Namie and Toyonaga Saitoh It is certified that error appears in the above-identified patent and that said Letters Patent is hereby corrected as shown below:

Col. 8, line 27, Claim 1, "an" should read -- a --;

Signed and Sealed this

Ninth Day of November, 2010

David J. Kappos  
*Director of the United States Patent and Trademark Office*